Nov. 17, 1970  A. MILO  3,541,283

LEAK DETECTOR FOR PUMPED LIQUID SYSTEMS

Filed Sept. 27, 1968  2 Sheets-Sheet 1

INVENTOR.
AUGUST MILO
BY *Peter J. Taylor*
ATTORNEY

United States Patent Office 3,541,283
Patented Nov. 17, 1970

3,541,283
LEAK DETECTOR FOR PUMPED LIQUID SYSTEMS
August Milo, 1015 Schliefer Drive,
Hillside, N.J. 07205
Filed Sept. 27, 1968, Ser. No. 763,183
Int. Cl. H01h 36/02
U.S. Cl. 200—84
3 Claims

ABSTRACT OF THE DISCLOSURE

A leak detector for detecting a leak in a liquid pump discharge system, such as a gasoline pumping and dispensing system, comprises a bowl body having a liquid discharge inlet and a cover sealably attached to the body. A vertically sliding valve is mounted in an opening in the cover and it is designed to vent air into or out of the bowl as the liquid level in the bowl rises or falls, and to seal off the bowl when the latter is filled with liquid under pressure. A float stem is mounted on the bottom of the cover with a float disposed around it in a manner such that when the liquid rises in the bowl, the float rises and when the level drops, the float drops. An electrical switch is disposed in the float mounting in a manner such that when the level falls the switch will provide a signal to indicate a leak in the system. A bleed plug for bleeding off any air in the bowl may be inserted in the cover, and a vent pipe may be connected to the cover and around the valve to vent air and vapors.

BACKGROUND OF THE INVENTION

In many cases, where flammable liquids are pumped and dispensed, as in gasoline stations, where there is a danger that leakage from the gasoline discharge system may be ignited and thus cause damage to life and property. In many instances, the operator either is unaware of such leakage, or is not concerned, and there is no other signalling or control means which would require the operator to have the leakage corrected.

Various leak detectors have been described in the art, such as, for example, those shown in Pats. Nos. 930,171, 2,717,989, 2,767,392, 2,769,395, and 2,952,-390. The trouble with previously-developed detectors of the type considered, is that they are influenced by temperature and pressure. For example, the detector described in Pat. No. 3,350,704 employs pressure change for signalling the presence of a leak. The difficulty involved with such a system is that when the dispensing of the liquid, such as gasoline, is stopped, and the pump is still running, the pressure will build up to, say 25 p.s.i., or so. Then, when the pump is stopped, the pressure may drop, due to temperature changes, even though no leak is present. Yet, the pressure-sensitive device of the unit will signal a leak.

There is need at the present time for a leak detector which will signal leaks only, and one which is unaffected by pressure and temperature changes in the absence of a leak. Such a detector should signal a leak in a remote control pumping and dispensing system, such as in a gasoline service station.

SUMMARY OF THE INVENTION

In the present invention, the leak detector is connected to the pump discharge line at any location, but preferably at the pedestal and at a point higher than any part of the discharge system. The detector comprises a bowl body having a sealed-on cover which carries a vertically movable valve disposed in an opening in the cover. The valve is provided with flute openings through which air may be vented when the valve is open. However, when liquid under pressure fills the bowl, the valve closes in sealing relation to the bottom of the cover, and no venting takes place. A float, also mounted on a stem attached to the cover, has an electrical switch actuated by the float in a manner so that when the liquid level rises and fills the bowl under pressure, no electrical signal is given. However, in the event of a leak, the liquid level in the bowl drops and the float actuates the electrical switch to provide the leak signal and also to shut off power from the pump which thereafter could not be operated until the leakage has been remedied.

According to the present invention, no leak is signalled until the liquid level in the bowl falls to a certain set value. This means that change in temperature or pressure of the system will not set off a leakage signal as long as the liquid level in the bowl has not dropped.

BRIEF DESCRIPTION OF THE DRAWINGS

The invention will be more readily understood by reference to the accompanying drawings in which a preferred embodiment is described, and in which.

The same numerals refer to similar parts in the various figures.

DESCRIPTION OF THE PREFERRED EMBODIMENTS

Figure 1:
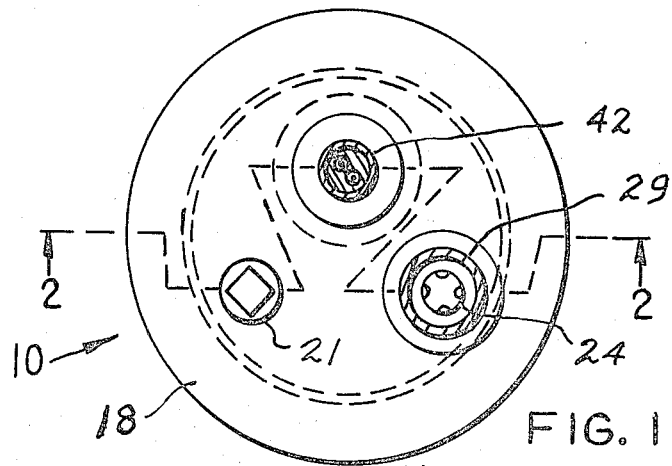
FIG. 1 illustrates a top or plan view of the leak detector of the present invention, with the upper portions of the conduit pipe and vent pipe cut away.

Referring to the drawings, numeral 10 refers generally to the leak detector of the present invention having a bowl-type body 11 provided with a bottom 12 having a threaded hole 13 for receiving a threaded nipple 14 of a four-way fixture, indicated generally as 15. The bowl body also has an upper opening carrying an inner thread 16 onto which is screwed threaded bottom portion 17 of cover or top 18. A gasket 19 effects sealing of the unit from the outside.

Figure 2:
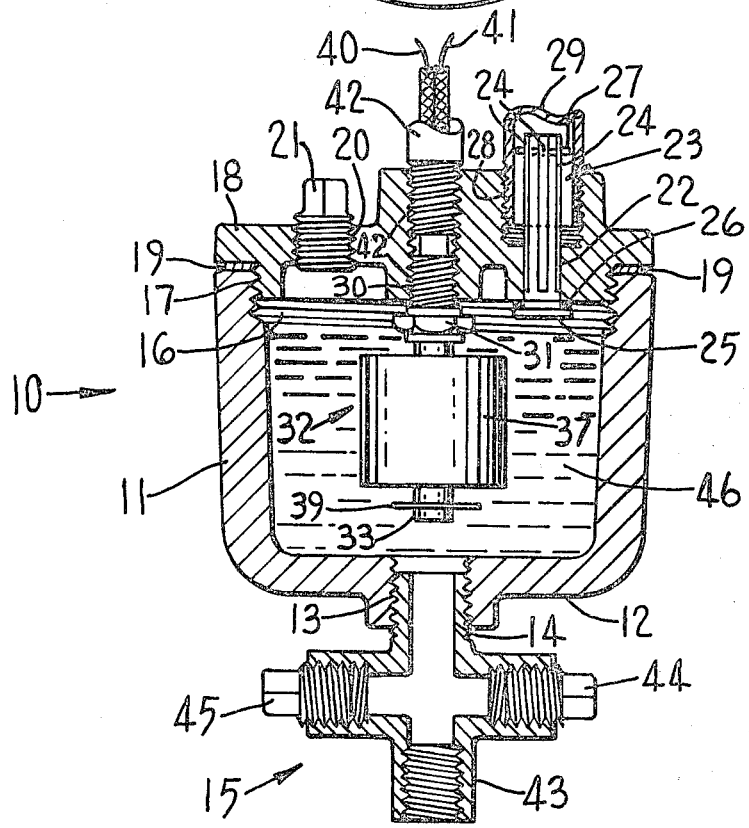
FIG. 2 depicts a cross-sectional front view of the unit shown in FIG. 1, taken along the planes of line 2—2 in FIG. 1, and in valve-sealing position.
Figure 3:
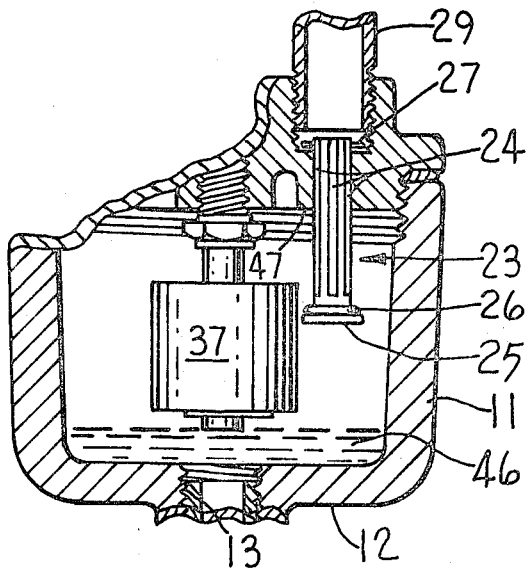
FIG. 3 shows a front view, similar to that in FIG. 2, but with a portion of the top and bottom cut away, and in valve venting position.

Cover 18 has a threaded hole 20 into which threaded bleeder plug 21 is screwed in outside sealing relation. Also, an opening 22 is provided in cover 18, in which slides vertical fluted vent valve, indicated generally as 23. This valve is provided with vertical flute openings 24 in its side, extending to near the bottom. The bottom of the valve comprises a widened stop 25, over and against the shoulder of which is disposed a gasoline-resistant rubber O-ring 26 which serves to seal the valve from the outside when it is in the closed position, as in FIG. 2. A cotter pin 27 in its upper portion serves as a stop for valve 23 when it is in open position, as in FIG. 3. A vent pipe 29, screwed into threaded hole 28 over the valve, serves to vent air and any vapors which are vented through flutes 24.

Figure 4:
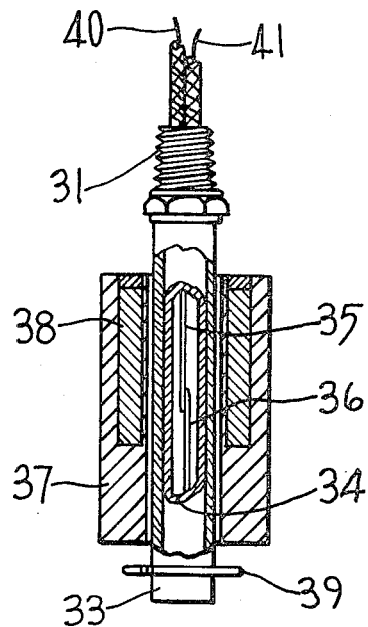
FIG. 4 presents a cross-sectional side view of the float and electrical switch mechanism used in the leak detector of FIGS. 1–3.

In the rear of cover 18 is threaded hole 30 into which screws a threaded upper fitting 31 of the level switch, designated generally as 32, and described in greater detail in FIG. 4. Such a conventional float switch (such as a Gems switch) has a nonmagnetic stem 33 attached to fitting 31. Inside of stem 33 is a sealed glass container 34 having two magnetic contact strips 35 and 36. A gasoline-resistant float 37 surrounds stem 33, and it carries permanent magnet 38. Retainer 39 serves as a bottom stop for float 37. From FIG. 4, it will be seen that when the float is down, as in FIG. 4, the magnet 38 keeps magnetic contacts 35–36 together to close the electrical circuit which leads from contacts 35–36, through leads 40–41, and to a switch pump, light, bell, or the like. When float 37 rises, magnet 38 is removed away from contacts 35–36, and the latter then spread apart and break the circuit. Wires 40–41 are desirably encased in conduit pipe 42 which is screwed into threaded hole 43 directly above hole 30.

Four-way fixture 15 is provided with a threaded inlet 43, which is connected to the pumped liquid line, such as the line for the gasoline being pumped. There may also be a drain plug 44 for optional testing, and another plug 45, which may be removed in the event a pressure gage or similar device is desired to be connected.

The leak detector of the present invention is desirably connected to the pump discharge line, preferably at the pedestal, and above all parts of the pump discharge line. When the pump begins pumping the liquid (e.g., gasoline), the liquid 46 will fill the body bowl 11, thereby causing float 37 to rise, thus forcing air in the bowl to be discharged through flutes 24 around the stem of valve 23. As the pressure in bowl 11 rises, vent valve 23 (which heretofore was in the position shown in FIG. 3) will rise and close, as in FIG. 2. O-ring will seal off discharge of any gasoline through vent pipe 29 as it abuts the top of stop 25 and the bottom 47 of cover 18. At this point it is desirable to open plug 21 to bleed off any air which may be entrapped in the bowl. The system is now ready to detect any leakage.

In the vent a leak occurs in the pump discharge line, the pressure in bowl 11 will drop (after the pump has stopped). This will cause the level of liquid 46 in bowl 11 to drop as air enters the bowl through vent pipe 29 and flute openings 24 on the valve stem. When float 37 drops sufficiently, it will close electrical contacts 35–36. This will shut off power from the pump, ring a bell, illuminate a light, or otherwise provide a warning signal or alarm to have the leak attended to.

Although one type of conventional float and switch mechanism has been described herein, it is to be understood that other suitable arrangements also may be employed.

I claim:
1. A leak detector for detecting a leak in a liquid pump discharge system, comprising:
   a bowl body having a liquid pump discharge inlet,
   a cover attached to said body in outside sealing relation,
   a vertically-sliding valve disposed in said cover and designed to vent air as liquid pressure increases in said bowl and to seal off said bowl when the latter is filled with liquid under pressure,
   a float stem mounting disposed in the bottom of said cover,
   a float stem and float disposed on said mounting and designed so that said float rises on said stem as liquid rises in said bowl, and said float drops as the liquid recedes from said bowl in the event of a leak, and
   electrical contact and circuit means disposed in said mounting for making electrical contact and opening or closing of an electrical circuit with the fall of said liquid level and thus provide signal means in the vent of a leak in said liquid discharge system.
2. A leak detector, according to claim 1, in which said cover has a bleed plug for bleeding air out of said bowl.
3. A leak detector, according to claim 1, in which the cover has a vent pipe connected thereon around said vent valve for venting off air and vapors.

References Cited

UNITED STATES PATENTS 3,437,771  4/1969  Nusbaum _____ 200—84

DONALD J. YUSKO, Primary Examiner

D. MYER, Assistant Examiner

U.S. Cl. X.R.

73—40.5; 222—51; 340—242